US012574877B2

(12) United States Patent
    Zha et al.

(10) Patent No.: US 12,574,877 B2
(45) Date of Patent: Mar. 10, 2026

(54) SYSTEMS AND METHODS FOR FAST ACQUISITION OF A PRIMARY SYNCHRONIZATION SIGNAL FOR 5G NEW RADIO NETWORK

(71) Applicant: PCTEL, Inc., Bloomingdale, IL (US)

(72) Inventors: Wei Zha, Boyds, MD (US); Kamran Ghavami, Clarksburg, MD (US); Amir Soltanian, Potomac, MD (US)

(73) Assignee: PCTEL, INC., Bloomingdale, IL (US)

( * ) Notice: Subject to any disclaimer, the term of this patent is extended or adjusted under 35 U.S.C. 154(b) by 918 days.

(21) Appl. No.: 17/810,711

(22) Filed: Jul. 5, 2022

(65) Prior Publication Data

US 2023/0345398 A1      Oct. 26, 2023

Related U.S. Application Data

(60) Provisional application No. 63/363,532, filed on Apr. 25, 2022.

(51) Int. Cl.
    *H04W 56/00*        (2009.01)
    *H04J 11/00*        (2006.01)

(52) U.S. Cl.
    CPC ....... *H04W 56/003* (2013.01); *H04J 11/0073* (2013.01); *H04W 56/001* (2013.01); *H04W 56/0035* (2013.01)

(58) Field of Classification Search
    None
    See application file for complete search history.

(56) References Cited

U.S. PATENT DOCUMENTS 9,608,905 B1      3/2017   Zhang et al.
11,483,191 B2 *  10/2022  Hellfajer ............. H04L 27/2663

OTHER PUBLICATIONS

Ota K. et al, "Performance of Physical Cell ID Detection Probability Considering Frequency Offset for NR Radio Interface," 2019 IEEE 90th Vehicular Technology Conference, pp. 1-6, Sep. 22, 2019. DOI: 10.1109/VTCFALL.2019.8891182.
You Y. et al, "Efficient Sequential Detection of Carrier Frequency Offset and Primary Synchronization Signal for 5G NR Systems," IEEE Transactions on Vehicular Technology, vol. 69, No. 8, pp. 9212-9216, Aug. 2020. ISSN: 0018-9545, DOI: 10.1109/TVT.2020. 3003901.
Extended European Search Report re application No. EP 22206216. 8, dated Sep. 18, 2023 (6 pages).

* cited by examiner

*Primary Examiner* — Willie J Daniel, Jr.
(74) *Attorney, Agent, or Firm* — Husch Blackwell LLP

(57)            ABSTRACT

Systems and methods for quickly acquiring a PSS of a broadcast signal are provided. Such systems and methods include performing a time domain differential correlation on sections of the broadcast signal and identifying peak values in a summation of results of the time domain differential correlation. The systems and method also include performing frequency domain differential correlations between the frequency domain versions of the first section and the second section and identifying ones of maximum values of a ratio of output of the frequency domain differential correlations. Finally, the provided systems and methods include searching for the PSS in localized regions of the broadcast signal that are defined in the time domain by the preconfigured number of peak values and in the frequency domain by the ones of the maximum values of the ratio.

20 Claims, 9 Drawing Sheets

500

502
Step 1: differential-correlation at SSB period apart

504
Step 2: combine PSS and SSS correlation values

506
Step 3: PSS Spectrum Detection (FFT and differential-correlation)

508
Step 4: localized PSS search

510
Step 5: verify by SSS, PBCH DM-RS, and MIB decoding

Loop through all blocks of PSS BW

Detected Cell-ID and Beam index for SSB

SYSTEMS AND METHODS FOR FAST ACQUISITION OF A PRIMARY SYNCHRONIZATION SIGNAL FOR 5G NEW RADIO NETWORK

CROSS REFERENCE TO RELATED APPLICATIONS

This application claims priority to U.S. application Ser. No. 63/363,532 filed Apr. 25, 2022 and titled "SYSTEMS AND METHODS FOR FAST ACQUISITION OF A PRIMARY SYNCHRONIZATION SIGNAL FOR 5G NEW RADIO NETWORK." U.S. Application No. 63/363,532 is hereby fully incorporated by reference as if set forth fully herein.

FIELD

The present invention relates generally to radio frequency (RF) communications hardware. More particularly, the present invention relates to systems and methods for quickly acquiring the primary synchronization signal (PSS) on a 5G new radio (NR) network.

BACKGROUND

Wireless cellular technology has expanded to adopt a 5G standard that can operate in a stand-alone mode or a non-stand-alone mode and include use of a 5G NR channel that can have one or more Synchronization Signal Blocks (SSBs). In the stand-alone mode, the 5G NR channel can include only one cell-defining SSB located on a wide global synchronization raster with a corresponding global synchronization channel number (GSCN). For example, for a frequency range above 24.25 GHz (i.e., an FR2 section of the 5G standard), a GSCN raster step size is 17.28 MHz. Because there are only several candidate frequencies to search for, user equipment can feasibly search for the cell-defining SSB quickly at start up. After the user equipment is connected to the 5G NR channel, the user equipment can receive radio resource control commands to search for other SSBs at different frequencies that are not necessarily on the global synchronization raster. The other SSBs can be located on any frequency within a bandwidth of the 5G NR channel bandwidth on a new radio absolute radio frequency channel number (NR-ARFCN) raster, which is narrower than the global synchronization raster. For example, for the FR2 section of the 5G standard, a NR-ARFCN raster step size is only 60 KHz. Accordingly, locating the other SSBs in the stand-alone mode is feasible. In the non-stand-alone mode, the user equipment can receive SSB frequency information from a radio resource control command after the user equipment is connected to a 4G LTE network, but in the non-stand-alone mode, the SSBs do not have to be located on the global synchronization raster. Accordingly, locating the SSBs in the non-stand-alone mode is also feasible.

In some instances, network monitoring and measuring can require blindly searching (e.g., conducting a blind scan) for and identifying all of the SSBs of the 5G NR channel, not just the one cell-defining SSB. The typical first step of the SSB search in the blind scan operation is to locate or acquire the PSS in two-dimensional space over both the frequency and time domains. The blind scan process executes an exhaustive search method where the user equipment tries every NR-ARFCN raster frequency for a valid cell by correlating 3 PSS sequences over every sample offset period for the SSB. However, the bandwidth of the 5G NR channel is wide. For example, a minimum channel bandwidth is 100 MHz for the FR2 frequency section of the 5G standard, a maximum channel bandwidth is 400 MHz for the FR2 frequency section of the 5G standard, and the bandwidth of the SSB is typically 28.8 MHz for a sub-carrier spacing (SCS) of 120 KHz. These features of the 5G NR channel mean that, for the FR2 frequency section of the 5G standard, one of the SSBs can be located on, at a minimum, any one of 1186 NR-ARFCN raster frequencies. Thus, in order to blindly scan for and identify all of the SSBs, a scanning receiver needs to perform a PSS correlation search on every sample time offset for each raster frequency candidate, which can be prohibitive in terms of time and cost when multiplied with a large number of frequencies.

In view of the above, there is a continuing, ongoing need for improved systems and methods.

SUMMARY

Embodiments described herein are directed to a method for acquiring a primary synchronization signal. The method comprises receiving a radio frequency (RF) broadcast signal at user equipment; performing, with the user equipment, a time domain differential correlation between a first section of the RF broadcast signal and a second section of the RF broadcast signal; summing together, with the user equipment, sections of an output of the time domain differential correlation that are separated by a preconfigured distance; identifying, with the user equipment, a preconfigured number of peak values in results of the summing; converting, with the user equipment, the first section and the second section of the RF broadcast signal into frequency domain versions of the first section and the second section that are localized to locations of the preconfigured number of peak values; performing, with the user equipment, frequency domain differential correlations between the frequency domain versions of the first section and the second section; identifying, with the user equipment, maximum values of a ratio between outputs of the frequency domain differential correlations; identifying, with the user equipment, ones of the maximum values of the ratio that are greater than or equal to a preconfigured threshold value; and searching, with the user equipment, for a primary synchronization signal (PSS) in localized regions of the RF broadcast signal. The localized regions are defined in the time domain by the preconfigured number of peak values in the results of the summing and in the frequency domain by the ones of the maximum values of the ratio that are greater than or equal to a preconfigured threshold value.

In some embodiments of the method, the preconfigured number of peak values is eight. Additionally, in some embodiments, the preconfigured distance is equal to a length of two orthogonal frequency-division multiplexing symbols.

In some embodiments, the method further comprises receiving the RF broadcast signal by sampling the RF broadcast signal at a length equivalent to at least two synchronization signal block (SSB) periods; and separating the RF broadcast signal into the first section and the second section such that the first section and the second section have respective lengths equivalent to at least one SSB period.

In some embodiments of the method, time domain boundaries of the localized regions defined by the preconfigured number of peak values in the results of the summing are plus and minus a cyclic prefix (CP) length of time around a respective sample time value of each of the preconfigured number of peak values. Furthermore, frequency domain boundaries of the localized regions defined by the ones of the maximum values of the ratio that are greater than or equal to the preconfigured threshold value are plus and minus five frequency bins around a respective frequency offset value of each of the maximum values of the ratio greater than or equal to the preconfigured threshold value.

In some embodiments of the method, the frequency domain differential correlations include a PSS correlation and a zero energy block correlation. The ratio is calculated by dividing the PSS block correlation by the zero energy block correlation for each frequency bin in the outputs of the frequency domain differential correlations.

In some embodiments, the method further comprises performing the time domain differential correlation using a sliding widow method by: filling a circular buffer of the user equipment is up to a correlation length with conjugate complex multiplications; outputting a summation of the conjugate complex multiplications as an initial correlation value; for each new time value sample offset of the first section and the second section, fetching an oldest entry of the circular buffer; subtracting the oldest entry from the previously output correlation value; after the oldest entry is subtracted, calculating a new conjugate complex multiplication and saving to the circular buffer as the newest entry; and adding the new conjugate complex multiplication to the previously output correlation value.

In some embodiments, the method further comprises performing the frequency domain differential correlations using a sliding widow method by: filling a circular buffer of the user equipment is up to a correlation length with conjugate complex multiplications; outputting a summation of the conjugate complex multiplications as an initial correlation value; for each new frequency value sample offset of the first section and the second section, fetching an oldest entry of the circular buffer; subtracting the oldest entry from the previously output correlation value; after the oldest entry is subtracted, calculating a new conjugate complex multiplication and saving to the circular buffer as the newest entry; and adding the new conjugate complex multiplication to the previously output correlation value.

In some embodiments, the method further comprises verifying and decoding a secondary synchronization signal, data modulation reference signal (PBCH DM-RS) and Master Information Block (MIB) of the RF broadcast signal with a PSS identified from searching the localized regions.

In some embodiments of the method, the RF broadcast signal is a 5G new radio broadcast signal.

Embodiments descried herein are also directed to a system for acquiring a primary synchronization signal with user equipment. The system comprises a radio frequency (RF) transceiver of the user equipment configured to receive an RF broadcast signal and a programmable processor of the user equipment configured to receive the RF broadcast signal from the RF transceiver. The programmable processor is also configured to execute a time domain differential correlation between a first section of the RF broadcast signal and a second section of the RF broadcast signal; sum together sections of an output of the time domain differential correlation that are separated by a preconfigured distance; identify a preconfigured number of peak values in results of the summation; convert the first section and the second section of the RF broadcast signal into frequency domain versions of the first section and the second section that are localized to locations of the preconfigured number of peak values; execute frequency domain differential correlations between the frequency domain versions of the first section and the second section; identify maximum values of a ratio between outputs of the frequency domain differential correlations; identify ones of the maximum values of the ratio that are greater than or equal to a preconfigured threshold value; and search for a primary synchronization signal (PSS) in localized regions of the RF broadcast signal. The localized regions are defined in the time domain by the preconfigured number of peak values in the results of the summing and in the frequency domain by the ones of the maximum values of the ratio that are greater than or equal to a preconfigured threshold value.

In some embodiments of the system, the preconfigured number of peak values is eight. Additionally, in some embodiments, the preconfigured distance is equal to a length of two orthogonal frequency-division multiplexing symbols.

In some embodiments, the RF transceiver is further configured to receive the RF broadcast signal by sampling the RF broadcast signal at a length equivalent to at least two synchronization signal block (SSB) periods. Furthermore, the programmable processor is further configured to separate the RF broadcast signal into the first section and the second section such that the first section and the second section have respective lengths equivalent to at least one SSB period.

In some embodiments, time domain boundaries of the localized regions defined by the preconfigured number of peak values in the results of the summation are plus and minus a cyclic prefix (CP) length of time around a respective sample time value of each of the preconfigured number of peak values. Similarly, frequency domain boundaries of the localized regions defined by the ones of the maximum values of the ratio that are greater than or equal to the preconfigured threshold value are plus and minus five frequency bins around a respective frequency offset value of each of the maximum values of the ratio greater than or equal to the preconfigured threshold value.

In some embodiments, the frequency domain differential correlations include a PSS correlation and a zero energy block correlation, and wherein the programmable processor is further configured to calculate the ratio by dividing the PSS block correlation by the zero energy block correlation for each frequency bin in the outputs of the frequency domain differential correlations.

In some embodiments of the system, the programmable processor executing the time domain differential correlation includes using a sliding widow method wherein the programmable processor is configured to fill a circular buffer of the user equipment is up to a correlation length with conjugate complex multiplications; output a summation of the conjugate complex multiplications as an initial correlation value; for each new time value sample offset of the first section and the second section, fetch an oldest entry of the circular buffer; subtract the oldest entry from the previously output correlation value; after the oldest entry is subtracted, calculate a new conjugate complex multiplication and save to the circular buffer as the newest entry; and add the new conjugate complex multiplication to the previously output correlation value.

In some embodiments of the system, the programmable processor executing the frequency domain differential correlations includes using a sliding widow method wherein the programmable processor is configured to fill a circular buffer of the user equipment is up to a correlation length with conjugate complex multiplications; output a summation of the conjugate complex multiplications as an initial correlation value; for each new frequency value sample offset of the first section and the second section, fetch an oldest entry of the circular buffer; subtract the oldest entry from the previously output correlation value; after the oldest entry is subtracted, calculate a new conjugate complex multiplication and save to the circular buffer as the newest entry; and add the new conjugate complex multiplication to the previously output correlation value.

In some embodiments of the system, the programmable processor is further configured to verify and decode a secondary synchronization signal, data modulation reference signal (PBCH DM-RS) and Master Information Block (MIB) of the RF broadcast signal with a PSS identified from searching the localized regions.

In some embodiments of the system, the RF broadcast signal is a 5G new radio broadcast signal.

DETAILED DESCRIPTION

Figure 1:
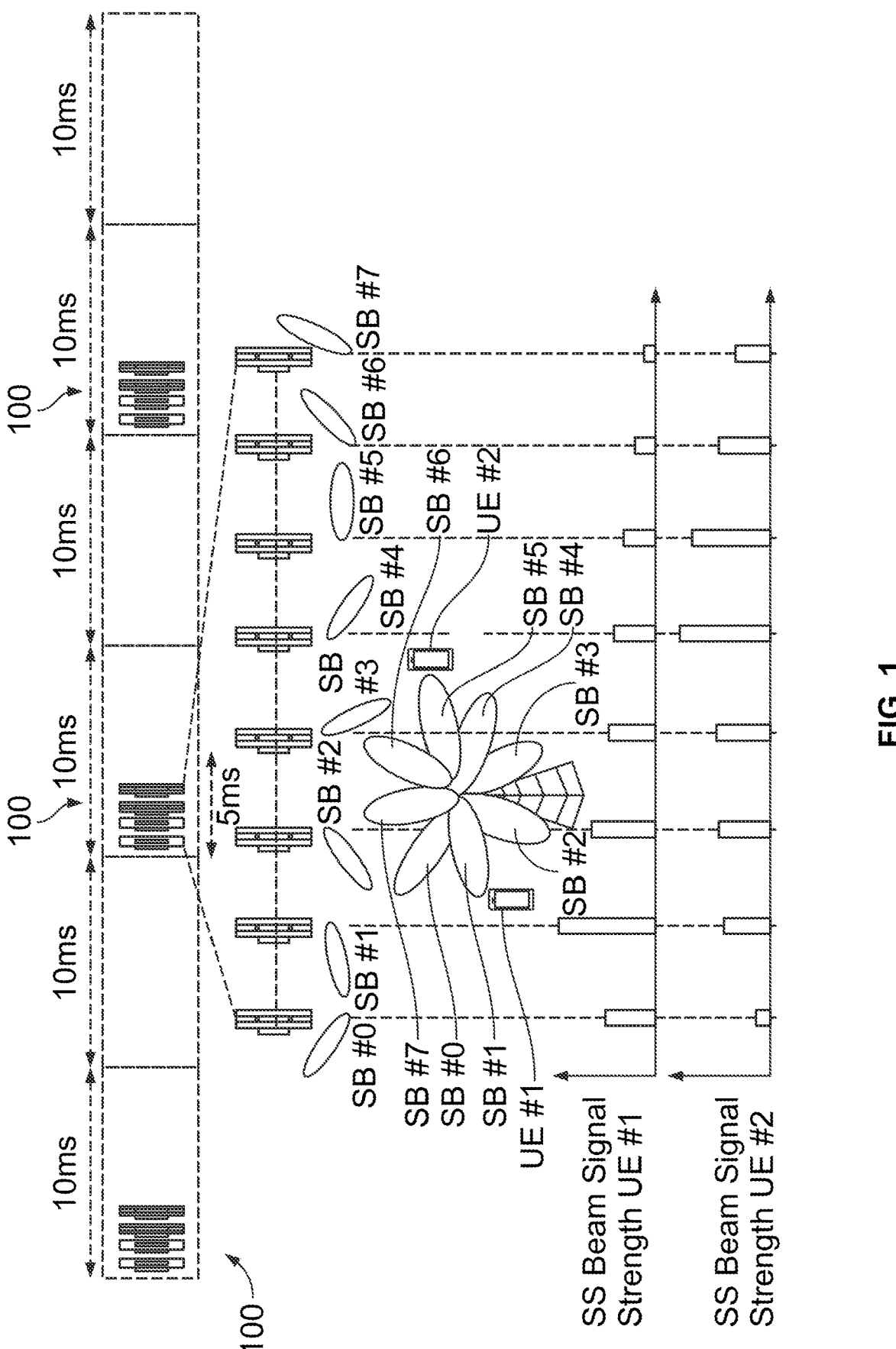
FIG. 1 is a schematic diagram of a conventional SSB broadcast.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods for quickly acquiring the PSS of a 5G NR signal using specific properties of the SSB broadcast.

First, as seen in FIG. 1, the 5G NR standard dictates that the SSBs 100 are transmitted periodically in a standard recurring manner, for example every 20 milliseconds. Between each period the PSS, secondary synchronization signal (SSS), and data modulation reference signal (PBCH DM-RS) of each SSB remains constant. Only the traffic part of PBCH that carries Master Information Block (MIB) is different for each period. To utilize this property to quickly acquire the PSS signal, the systems and methods described herein first sample the 5G NR radio signal at a length equivalent to at least 2 SSB periods.

Then, the systems and methods described herein perform an SSB period differential correlation step where, in the time domain, a differential correlation between a first section of the sampled signal and a second section of the sampled signal over every sample offset of the SSB period is performed. The first section of the sampled signal is separated from the second section of the sampled signal by a length of 1 SSB period so that the first section of the sampled signal and the second section of the sampled signal both include instances of the broadcast SSBs. It should be understood that the first section and the second section could instead be received by separate distinct sampling steps.

In some embodiments, the time domain differential correlation of the sections of the sampled signal can be implemented by a sliding window method. In these embodiments, when calculating the time domain differential correlation for the next sample offset, the oldest term is removed from the summation and the new term is added. Note this sliding window correlation is not possible with the straightforward conventional method that correlates the received signal with known fixed PSS sequences. Using the sliding window correlation on the noisy received signal as reference can produce a performance loss of ~3 dB compared to correlation with fixed PSS sequences, but this small performance loss is more than made up for by the resulting decrease in processing time and increase calculation efficiency.

Figure 2:
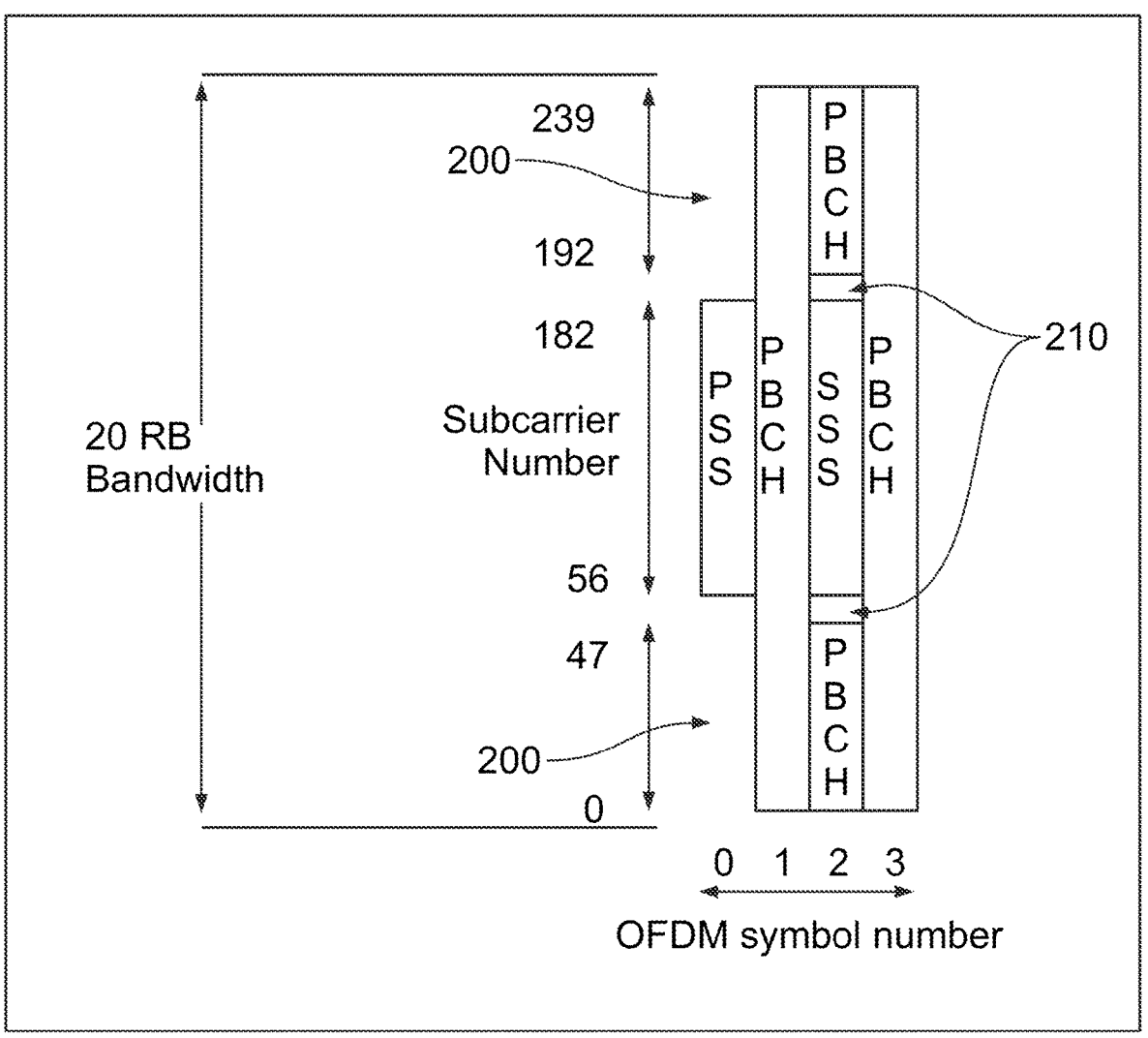
FIGS. 2 and 3 are schematic diagrams of conventional SSBs within an SSB broadcast.
Figure 3:
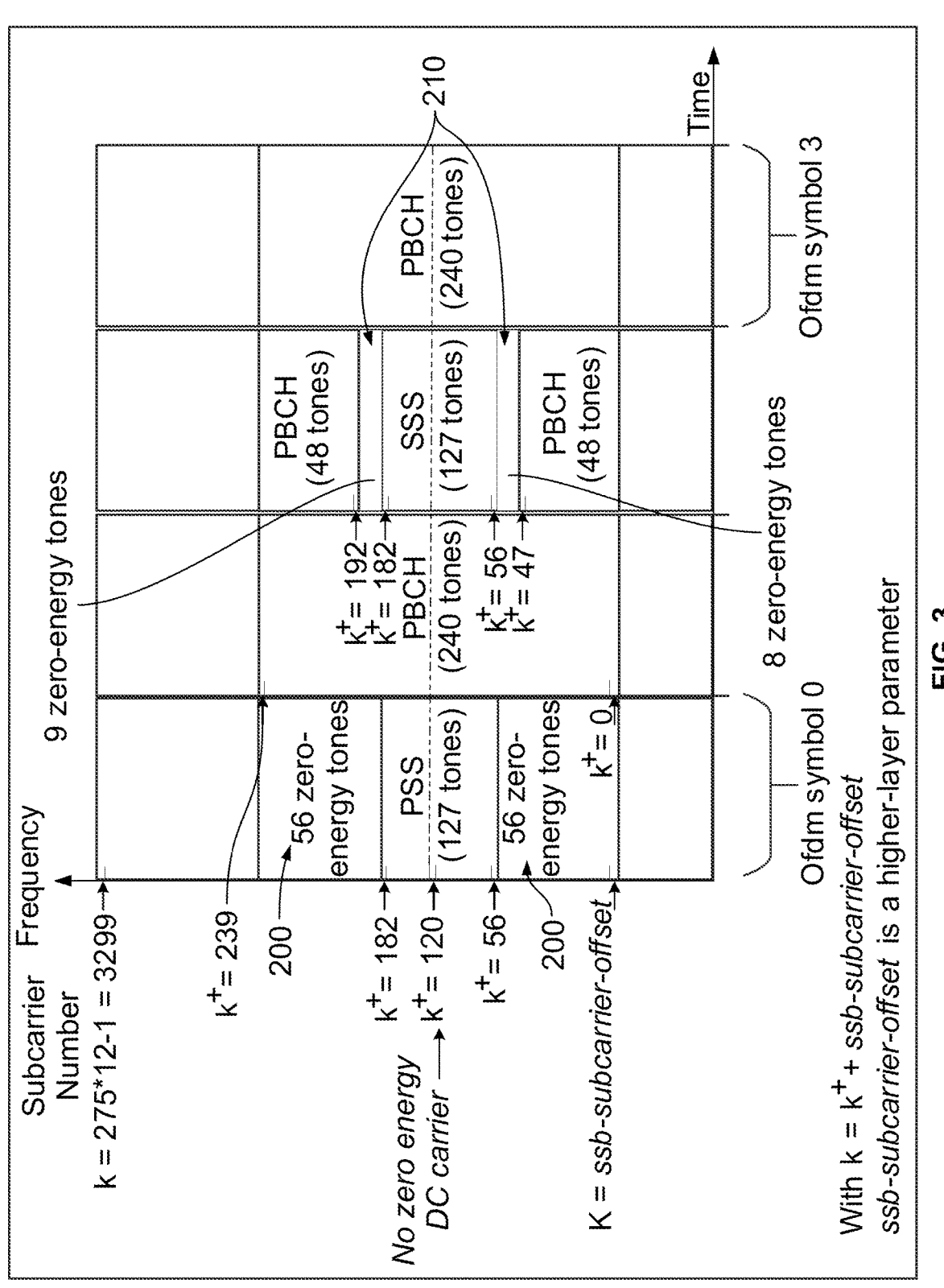

The second beneficial feature of the SSB broadcast utilized by the systems and methods described herein can be seen in references to FIGS. 2 and 3. As seen in FIGS. 2 and 3, the PSS and SSS portions of the SSBs in the sampled signal are always 2 orthogonal frequency-division multiplexing (OFDM) symbols apart. Other signals and general noise do not usually have this property. The systems and methods described herein utilize this feature to increase the prominence of the true PSS signal in the time domain differential correlation results by performing a PSS and SSS combining step. This PSS and SSS combining step includes summing together sections of the time domain differential correlation results that are separated by a distance of 2 OFDM symbols. After the summation, a preconfigured number N of the highest value correlation peaks in the summed version of the time domain differential correlation results can be exported for processing at a next step according to the systems and methods described herein.

The third beneficial feature of the SSB broadcast utilized by the systems and methods described herein can also be seen in references to FIGS. 2 and 3. As seen in FIGS. 2 and 3, the section of SSBs that contains the PSS includes zero energy regions or blocks 200 on either side of the frequency range of the received signal that includes the PSS. The occurrence of the zero energy blocks 200 is unique to the location of the SSBs in the sampled signal. The systems and methods described herein can utilize the occurrence of the zero energy blocks 200 to identify the frequency domain location of the PSS within the SSBs in a PSS Spectrum Detection step.

In particular, the first section and the second section of the sampled signal are transformed into the frequency domain using a Fast Fourier Transform (FFT) or similar conversion method. In some embodiments, portions of the first section and the second section of the sampled signal that are subject to the FFT can be localized around the N highest peak correlation values identified from the PSS and SSS combining step. Then, additional differential correlations of the first and second sections of the sampled signal are performed, this time in the frequency domain. As above, in some embodiments, the frequency domain differential correlations can be implemented by the sliding window method. In some embodiments, the frequency domain differential correlations can include a frequency domain differential correlation for the PSS length and a frequency domain correlation for the two zero energy block lengths.

Next, from the output of the frequency domain differential correlations, a ratio is calculated by dividing the PSS block correlation by the zero-energy block correlation for each FFT bin (or tone) offset in the output of the frequency domain differential correlations. Finally, the maximum ratio values are identified and compared to a preconfigured threshold. Ones of the maximum ratio values that are below the threshold are then discarded as not containing the PSS and the frequency domain location of the PSS can be identified from the remaining non-discarded maximum ratio values, for example the PSS can be identified as the FFT bin (tone) offset of the maximum ratio value. Utilizing the frequency domain differential correlation and ratio calculations allows for improved results as compared with simply calculating the spectrum power that matches the PSS and two zero-energy blocks pattern because the spectrum power method is problematic when the signal power is close to noise floor power (e.g., a signal to noise ratio (SNR) close to 0 dB).

From the combined results of the SSB period differential correlation, the PSS and SSS combining, and the PSS Spectrum Detection steps described above, the systems and methods described herein can reduce the normally large scale PSS two-dimensional search problem to a small-scale localized search around the PSS position at the sample time offset and frequency offset found from those prior steps. In particular, the systems and methods described herein can perform a localized PSS search step where the PSS search is limited in the frequency domain to +/−5 frequency bins (tones) of the identified frequency offset and +/−a cyclic prefix (CP) length of time relative to the identified sample time offset. From the output of the localized PSS search standard verification and decoding of the SSS, PBCH DM-RS and MIB can be accomplished.

Figure 4:
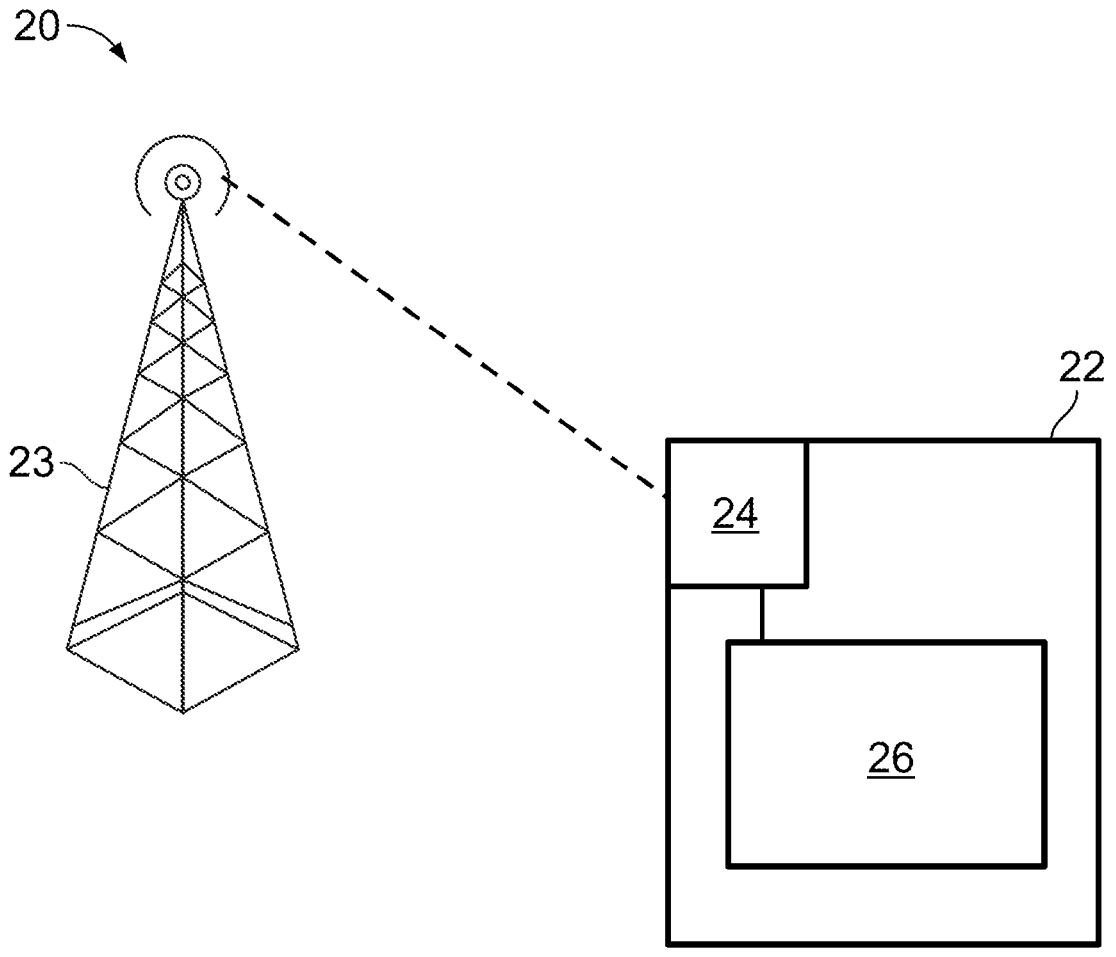
FIG. 4 is a block diagram of a system according to disclosed embodiments.

FIG. 4 is a block diagram of an RF communications system 20 according to disclosed embodiments. As seen in FIG. 3, the RF communications system 20 can include user equipment 22 and broadcast equipment 23. The user equipment 22 can include a programmable processor 26 and an RF transceiver 24 that can receive RF signals broadcast by the broadcast equipment 23. The RF signals broadcast by the broadcast equipment 23 can include the SSBs broadcast described herein and the programmable processor 26 can be configured to perform one or more of the fast PSS acquisition process steps described herein. Furthermore, it is to be understood that the user equipment 22 and the broadcast equipment 23 can included respective transceiver devices and memory devices, each of which can be in communication with control circuitry, one or more programmable processors (such as the programmable processor 26), and executable control software as would be understood by one of ordinary skill in the art. In some embodiments, such control software can be stored on a transitory or non-transitory computer readable medium, including, but not limited to local computer memory, RAM, optical storage media, magnetic storage media, flash memory, and the like, and some or all of the control circuitry, the programmable processors, and the control software can execute and control at least some of the methods described herein.

Figure 5:
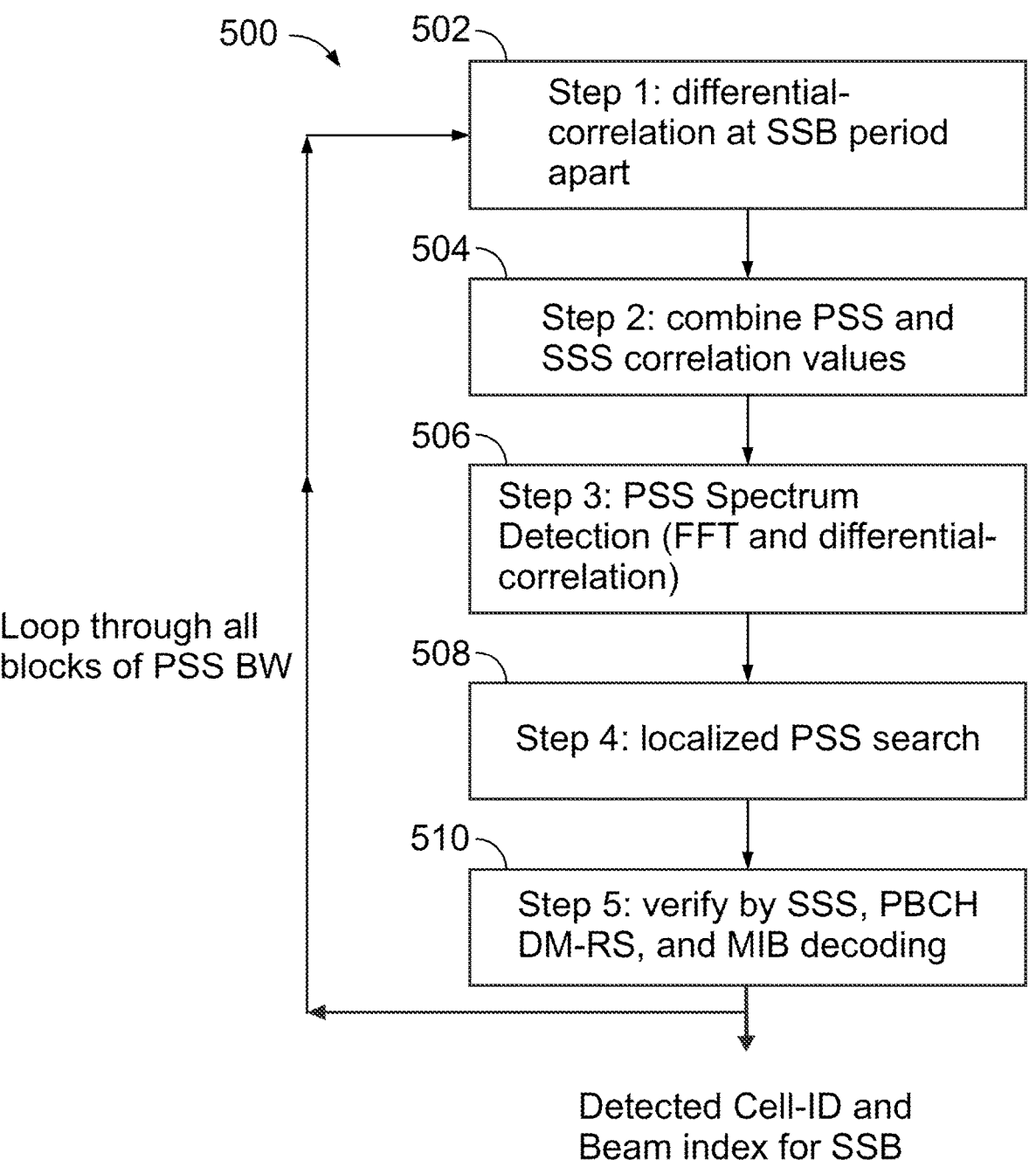
FIG. 5 is a flow diagram of a method according to disclosed embodiments.

FIG. 5 is a flow diagram of a method 500 for quickly acquiring a PSS from a 5G NR SSB broadcast according to disclosed embodiments. As seen in FIG. 5, the method 500 can include the user equipment 22 performing the SSB period differential correlation step, as in 502. Then, the method 500 can include the user equipment 22 performing the PSS and SSS combining step, as in 504. Next, the method 500 can include the user equipment 22 performing the PSS Spectrum Detection, as in 506. Furthermore, the method 500 can include the user equipment 22 performing the localized PSS search step, as in 508. Then, the method 500 can include the user equipment 22 verifying and decoding the SSS, PBCH DM-RS and MIB from the identified PSS, as in 510. Finally, the method 500 can include repeating steps 502-510 through all blocks of the PSS bandwidth until the Cell-Id and beam index for the SSB are identified. In some embodiments, the method 500 can include the user equipment 22 performing the steps 502-510 at each block of the PSS bandwidth first before proceeding to a next one of the steps 502-510.

The notable improvements in processing time and calculation efficiency afforded by the method 500 can be fully demonstrated by way of a specific non-limiting example and comparison against more conventional PSS acquisition methods. For this example, the specific task for the user equipment 22 is to find all the PSSs for an SCS of 120 KHz from the frequency 24 GHz to 47 GHz at a raster step of 60 KHz. Furthermore, for purposes of this example, the default 20 ms SSB period can be used.

In this example, the number of channels the user equipment 22 needs to search is approximately the frequency range (e.g., 23E+09) divided by the raster step frequency (e.g. 60E+03), which when calculated comes to 3.83333E+05 channels. For each ARFCN raster frequency, the conventional PSS acquisition solution performs PSS correlation on every time offset. In this example, where the OFDM symbol length is 512 samples and the CP length is 36 samples, the PSS correlation length is equal to the sum of both 512+36 or 548. For the 120 KHz SCS, the 548 correlation length corresponds to sampling rate 61.44 Msps. This means that 20 ms data has 61.44E+06*20E−3 or 1.2288E+06 samples. In the conventional PSS acquisition solution, the received signal is correlated against three distinct known PSS sequences stored in the user equipment 22. The total processing amount in terms of the number of complex multiplications and additions can be calculated as 3 times the product of the PSS correlation length, the total amount of samples, and the total number of channels to be searched (e.g., 548*1.2288E+06*3.83333E+05*3), which when calculated for this example comes to 7.744E+14 total operations.

Therefore, it can be seen that the large number of ARFCN faster frequencies leads to an extremely high amount of processing, and thus a very low scan speed. Specifically, a typical digital signal processor (DSP), ARM core, or the like running at a typical clock rate of around 1 GHz, can complete one complex multiplication and addition per clock cycle. In the specific context of this example, the total time in seconds needed for the PSS acquisition is equal to the total number of complex operations divided by typical clock rate (e.g., 7.744E+14/1.0E+09), which when calculated come to 7.744E+05 seconds or 215 hours and 6 minutes.

In contrast to the conventional approach above, application of the method 500 as described herein to the same example broadcast SSB signal results in considerable time and computational savings. First, the user equipment 22 receives the broadcast SSB signal from the broadcast equipment 23 and initiates the method 500 by performing the SSB period differential correlation step on the received broadcast SSB signal. As described herein, the SSB period differential correlation step can include performing a sliding window differential correlation technique to first and second sections of the received broadcast SSB signal that are separated by one SSB period length (e.g., 20 ms in the current example).

The sliding window differential correlation is an efficient method to calculate the differential correlation for every sample offset of the received broadcast SSB signal. First, a circular buffer of the user equipment 22 is filled up to the correlation length with conjugate complex multiplications and a summation of the conjugate complex multiplications is output as an initial correlation value. Next, for each new sample offset, the oldest entry of the circular buffer is fetched and subtracted from the previously output correlation value, and a new conjugate complex multiplication is calculated and added to the previously output correlation value. The new conjugate complex multiplication is also stored to the circular buffer as the newest entry, which because of the circular nature of the buffer overwrites the oldest entry. The user equipment 22 employing the sliding window differential correlation can complete one sample offset with one complex subtraction operation, one complex multiplication operation, and one complex addition operation, which can be approximated as 1.5 complex multiplication/addition operations. The user equipment 22 can also use this process to calculate power for normalization (division). Thus, the total processing per sample can be approximated as 4 complex multiplications/additions. This first step is then repeated for the total PSS frequency bandwidth (15.36 MHz steps). Thus, the total number of repeats from 24 GHz to 47 GHz is the frequency range (23E+09) divided by the total PSS frequency bandwidth (15.36E+06), which when calculated equals 1.497E+03. The total processing in terms number of complex multiplications/additions can then be calculated as 4 times the product of the total number of repeats and the total amount of samples (e.g., 4*1.2288E+06*1.497E+03), which when calculated for this example comes to 7.358E+09 total operations for the SSB period differential correlation step 502 of the method 500.

Figure 6:
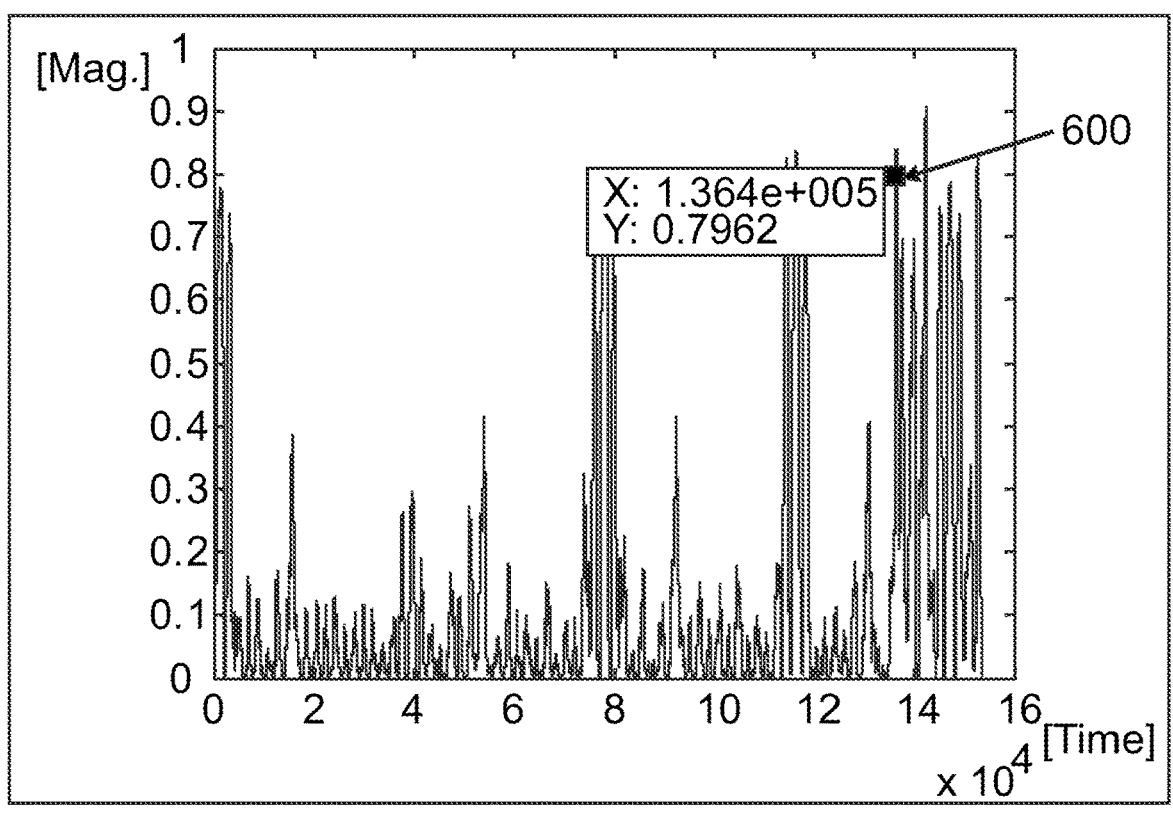
FIG. 6 is a graph of a time domain signal output from an SSB period differential correlation step according to disclosed embodiments.
Figure 7:
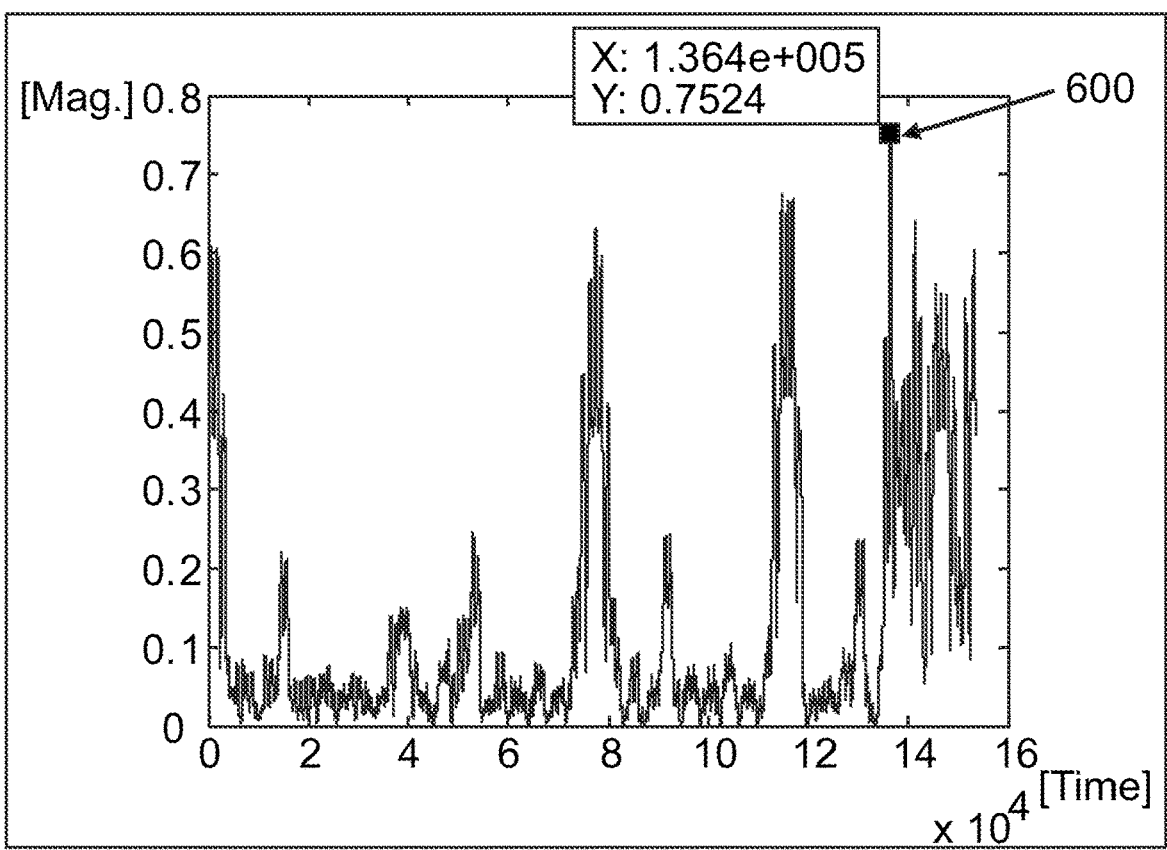
FIG. 7 is a graph of a modified time domain signal output from an PSS and SSS combining step according to disclosed embodiments.

FIG. 6 shows a graph of the time domain signal output from the SSB period differential correlation step 502 of the method 500. As seen in FIG. 6, the true PSS position 600 is at sample time offset 1.364e+005, but that sample time offset is still not the highest peak in the output signal. In order to indicate the true PSS position 600 more clearly, the user equipment 22 processes the time domain signal output from the differential correlation step 502 with the PSS and SSS combining step 504. In particular, the user equipment 22 adds together sections of the time domain signal output that are separated by a distance of 2 OFDM symbols to produce the graph of the modified time domain output signal shown in FIG. 7. As seen in FIG. 7, the modified time domain output signal now shows the true PSS position 600 as the highest peak. Furthermore, because the PSS and SSS combining step 504 performs a real addition, the time and number of processing operations required are considered negligible with respect to the number of operations performed by the SSB period differential correlation step 502. Thus, these negligible additional operations can be absorbed into the total number of operations calculated above with respect to the SSB period differential correlation step 502.

After performing the PSS and SSS combining step 504, the user equipment 22 can proceed to perform the PSS Spectrum Detection step 506, where the user equipment 22 performs a FFT on the first and second sections of the received broadcast SSB signals to convert the sections into the frequency domain. In particular, the user equipment 22 can perform the FFT on portions of the first and second sections localized around the highest peak correlation values identified from the PSS and SSS combining step. Then, the user equipment 22 performs the frequency domain differential correlations on the two FFT outputs. At this point in the process, the detected time offset is around the true time offset of the PSS (usually within +/−a CP length). If the user equipment 22 were to directly correlate the signal at this time offset with the 3 PSS sequences, the correlation value would not be very high because a shift of several samples can cause the correlation value to drop. Further, because the position of the PSS in frequency domain is not yet known direct PSS correlation is not yet possible. However, these issues do not cause problems for the PSS Spectrum Detection step 506 because both of the two FFT outputs that the user equipment 22 inputs into the frequency domain differential correlations are frequency shifted by the same amount. Thus, uncertainty in the frequency position does not affect the frequency domain differential correlations results. Furthermore, insertion of a CP before the OFDM symbol can change the linear convolution operation to a circular convolution operation after FFT. Further still, any uncertainty in the time domain location of the PSS will cause the same amount of phase shift to both FFT outputs, so time position uncertainty also does not affect the frequency domain differential correlation results.

From the frequency domain differential correlation results, the user equipment 22 then determines the ratio of PSS block correlation to zero-energy block correlation for each FFT bin or tone offset in the output of the frequency domain differential correlations by, for example, dividing the PSS length frequency domain correlation result by the zero energy block length frequency domain correlation results. The user equipment 22 can then identify the maximum ratio values (e.g. peaks) in the ratio values vs frequency and compare the maximum ratio values to a preconfigured threshold to identify the PSS location in the frequency domain as described herein.

Figure 8:
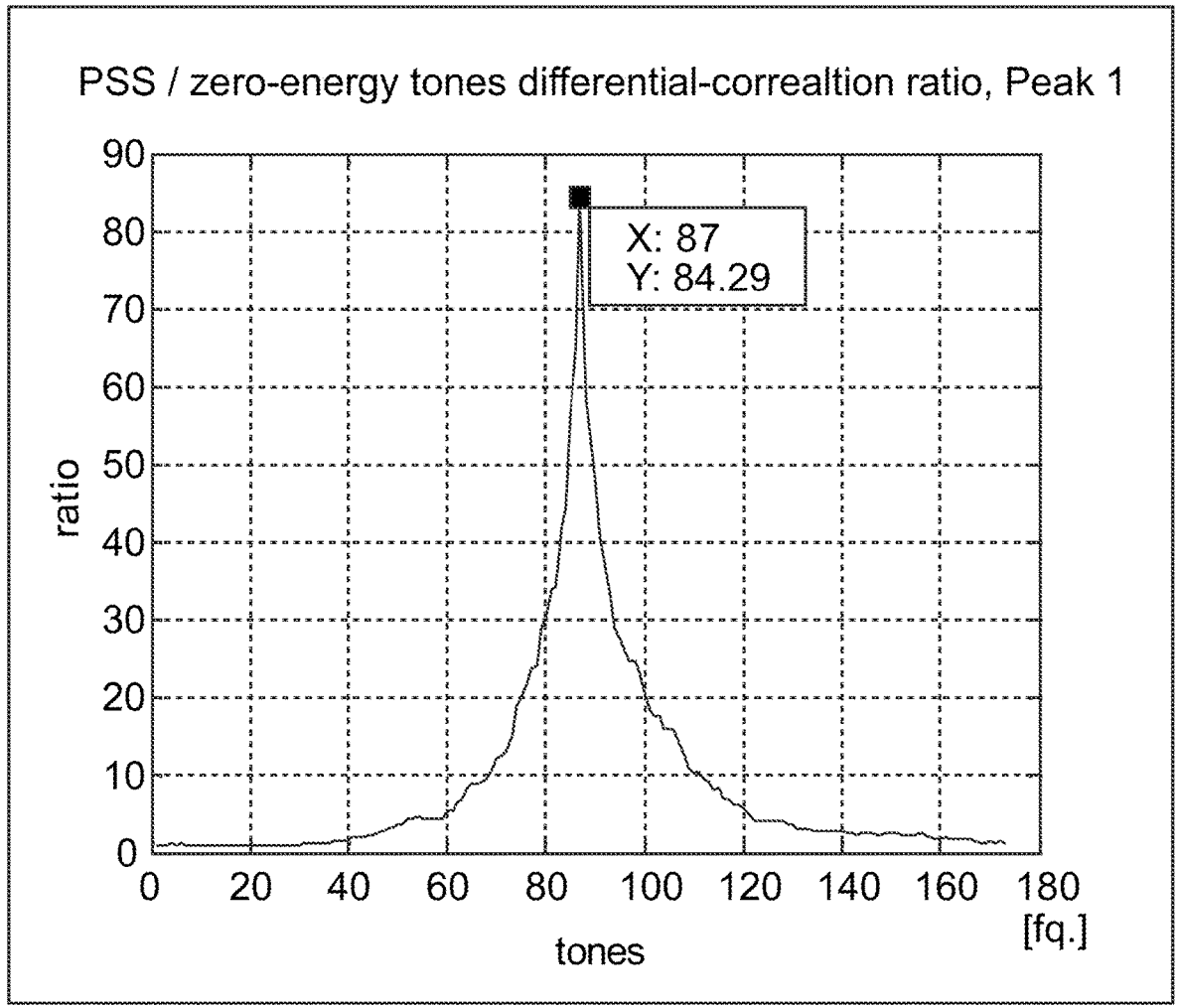
FIG. 8 is a graph of a ratio of a PSS block correlation to a zero-energy block correlation vs frequency according to disclosed embodiments.
Figure 9:
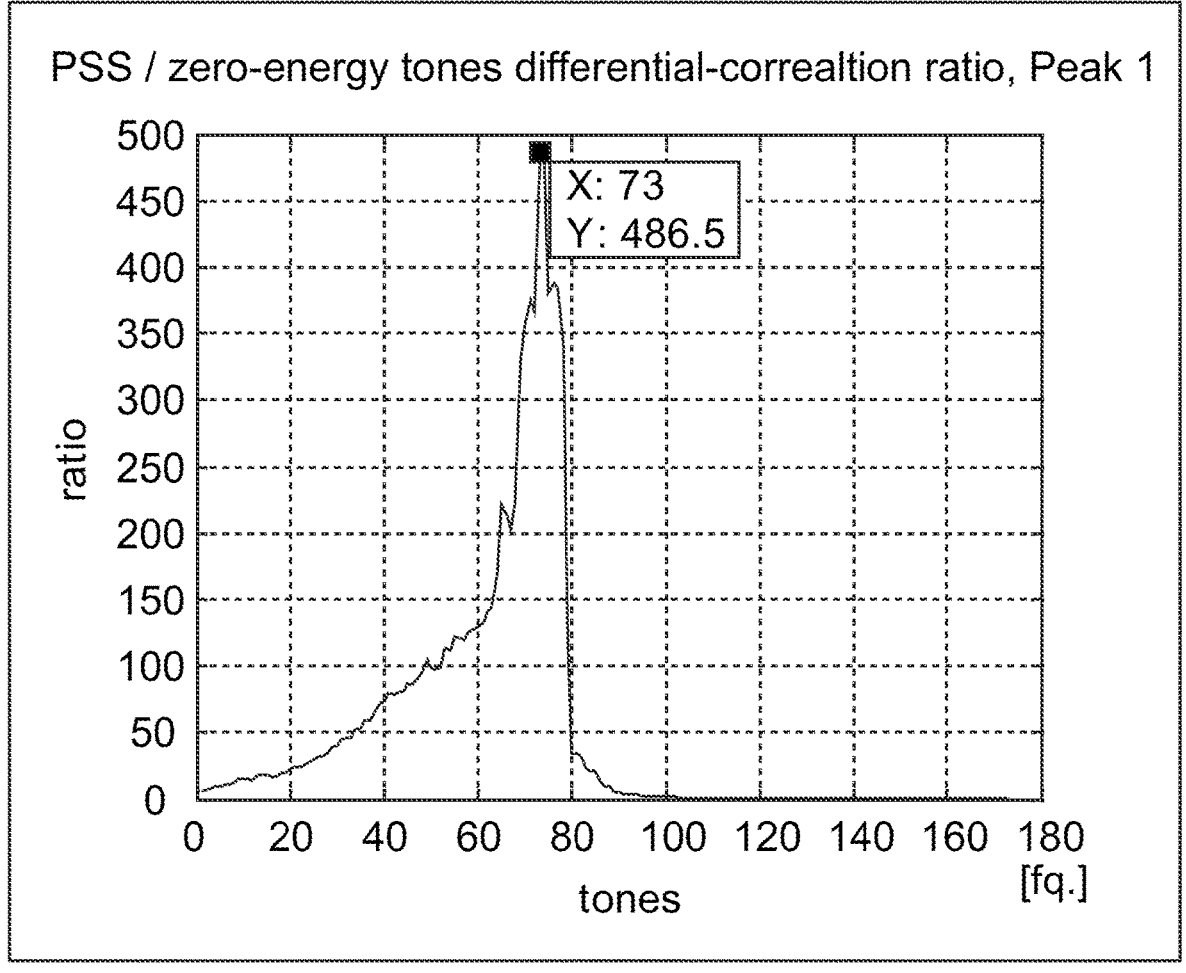
FIG. 9 is a graph of a ratio of a PSS block correlation to a zero-energy block correlation vs frequency according to disclosed embodiments.
Figure 10:
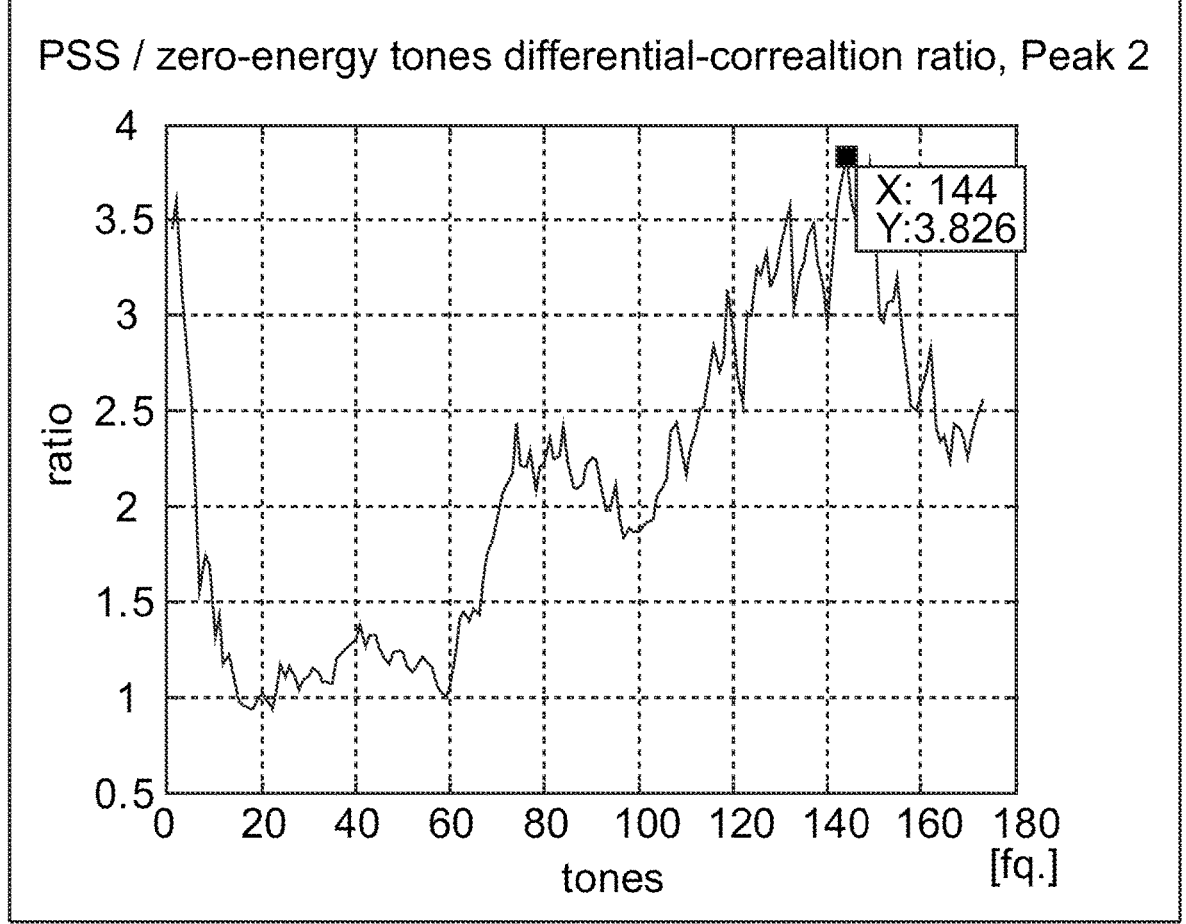
FIG. 10 is a graph of a ratio of a PSS block correlation to a zero-energy block correlation vs frequency according to disclosed embodiments.

FIG. 8 shows an example graph of the ratio of the PSS block correlation to zero-energy block correlation vs frequency for an example where the broadcast SSB signal was collected with an SSB center aligned with a data collection center frequency. As seen in FIG. 8, the peak of the PSS to zero-energy ratio is located at frequency bin or tone number 87, which in this case is the center. FIG. 9 shows another example graph of the ratio of the PSS block correlation to zero-energy block correlation vs frequency for an example where the broadcast SSB signal was collected at a frequency 200 KHz lower than center, which for an SCS of 15 KHz is equal to 200/15 or 13.33 tones lower than center. As seen in FIG. 9, the peak is detected at tone number 73, which is 14 tones lower than the center at tone number 87. Thus, the peak position can roughly determine the true PSS location in the frequency domain. In contrast, FIG. 10 shows an example graph of the ratio of the PSS block correlation to zero-energy block correlation vs frequency for a section of the received broadcast SSB signal where there is no PSS signal present. For this case, because the peak value is very low, the peak is filtered out and discarded when compared against the preconfigured threshold.

In the context of the general processing time example, the user equipment 22 can process and calculate the top 8 peaks for the PSS to zero-energy ratio and check those ratios against the preconfigured threshold. For each peak, two FFT-512 are performed first at a complexity of N*log 2(N), where N is the OFDM symbol length or 512 for this example, which when calculated comes to a complexity of 4608 per FFT. The frequency domain differential correlation over the 512 FFT bins (tones) using the sliding window method can then be approximated as 1.5*512 or 768 complex multiplications/additions. Thus, the total processing for this step can be defined by the total complexity times 2 plus the number of complex multiplications/additions together multiplied by the number of peaks and the total number of repeats in the frequency range (e.g. (4608*2+768) *8*1.497E+03), which when calculated comes to 1.196E+ 06, which in comparison to the conventional method described above is very small.

After performing the PSS Spectrum Detection step 506, the user equipment 22 can perform the localized PSS search step 508 with respect to the peaks that pass threshold check in the PSS Spectrum Detection step 506. For the localized PSS search step 508, the user equipment 22 can limit the PSS search range in the frequency domain to +/−5 frequency bins or tones, and can limit the PSS search in the time domain to +/−the CP length. For the current example, the search in frequency direction is limited to +/−5 frequency tones equivalent to 21 raster channels. The Search in time direction can be limited to +/−73 sample offsets (e.g. the CP length). The 548 long correlation is now performed for all three known PSS sequences stored in the user equipment 22. However, unlike the conventional process, the search is localized to the peaks that passed the threshold check, for example 2 peaks of the top 8 peaks for the PSS to zero-energy ratio. In this case the total processing for the 2 peaks can be defined as twice (e.g. the number of peaks) and three times (e.g. the number of PSS correlations) the product of the PSS correlation length, the 21 raster channels, the CP sample time offset, and the total number of repeats in the frequency range (e.g. 2*3*548*21*73*1.497E+03), which when calculated comes to 7.546E+09. The processing amounts calculated for steps 502-506 of the method 500 can then be summed to yield a final total processing of 1.491E+ 10. Thus, employing the method 500 reduces the total processing by 5.194E+04 times (e.g. 7.744E+14/1.491E+ 10). Furthermore, total processing time for steps 502-508 of the method 500 on a typical DSP or ARM core can be expressed as 1.491E+10/1.0E+09 or 14.91 secs. The verification and decoding step 510 of the method 500 is similar to that performed in the conventional method so does not offer any additional time or efficiency savings.

While the above example and other embodiments described herein have been directed to PSS search in the context of 5G NR applications, it should be noted that some or all of the systems and methods described herein can be adapted to improved PSS acquisition in the context of LTE type signals. For example, the systems and methods described herein can be extended to find all valid LTE channels of a specific LTE band. In the context of LTE bands having a 2 GHz frequency or above, the total BW is in the 100 MHz range and the LTE channel raster size is 100 KHz. Normally, LTE channel search starts with PSS correlation on every sample time offset. The LTE frame structure is similar to the 5G NR SSB. Specifically, the LTE frame structure has a 10 ms periodicity, the PSS and SSS have a fixed relative position in number of OFDM symbols, and the traffic around the PSS and SSS are not repetitive so as show a low differential correlation value. Thus, the systems and methods described herein can be adapted for use on the LTE frame structure by performing the time domain differential correlation at 10 ms apart, combing the PSS and SSS time domain correlation values, detecting the PSS (and SSS) spectrum using the ratio of PSS/SSS to traffic block correlation as described herein.

Although a few embodiments have been described in detail above, other modifications are possible. For example, other components may be added to or removed from the described systems, and other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method for acquiring a primary synchronization signal, the method comprising:
   receiving a radio frequency (RF) broadcast signal at user equipment;
   performing, with the user equipment, a time direction differential correlation between a first section of the RF broadcast signal and a second section of the RF broadcast signal;
   summing together, with the user equipment, sections of an output of the time direction differential correlation that are separated by a preconfigured distance;
   identifying, with the user equipment, a preconfigured number of peak values in results of the summing;
   converting, with the user equipment, the first section and the second section of the RF broadcast signal into frequency domain versions of the first section and the second section that are localized to locations of the preconfigured number of peak values;
   performing, with the user equipment, frequency direction differential correlations between the frequency domain versions of the first section and the second section;
   identifying, with the user equipment, maximum values of a ratio between outputs of the frequency direction differential correlations;
   identifying, with the user equipment, ones of the maximum values of the ratio that are greater than or equal to a preconfigured threshold value;
   searching, with the user equipment, for a primary synchronization signal (PSS) in localized regions of the RF broadcast signal, wherein the localized regions are defined in the time domain by the preconfigured number of peak values in the results of the summing and in the frequency domain by the ones of the maximum values of the ratio that are greater than or equal to a preconfigured threshold value.

2. The method of claim 1 wherein the preconfigured number of peak values is eight.

3. The method of claim 1 wherein the preconfigured distance is equal to a length of two orthogonal frequency-division multiplexing symbols.

4. The method of claim 1 further comprising:
   receiving the RF broadcast signal by sampling the RF broadcast signal at a length equivalent to at least two synchronization signal block (SSB) periods; and
   separating the RF broadcast signal into the first section and the second section such that the first section and the second section have respective lengths equivalent to at least one SSB period.

5. The method of claim 1 wherein time domain boundaries of the localized regions defined by the preconfigured number of peak values in the results of the summing are plus and minus a cyclic prefix (CP) length of time around a respective sample time value of each of the preconfigured number of peak values, and wherein frequency domain boundaries of the localized regions defined by the ones of the maximum values of the ratio that are greater than or equal to the preconfigured threshold value are plus and minus five frequency bins around a respective frequency offset value of each of the maximum values of the ratio greater than or equal to the preconfigured threshold value.

6. The method of claim 1 wherein the frequency direction differential correlations include a PSS correlation and a zero energy block correlation, and wherein the ratio is calculated by dividing the PSS block correlation by the zero energy block correlation for each frequency bin in the outputs of the frequency direction differential correlations.

7. The method of claim 1 further comprising performing the time direction differential correlation using a sliding widow method by:

filling a circular buffer of the user equipment is up to a correlation length with conjugate complex multiplications;

outputting a summation of the conjugate complex multiplications as an initial correlation value;

for each new time value sample offset of the first section and the second section, fetching an oldest entry of the circular buffer;

subtracting the oldest entry from the previously output correlation value;

after the oldest entry is subtracted, calculating a new conjugate complex multiplication and saving to the circular as the newest entry; and adding the new conjugate complex multiplication to the previously output correlation value.

8. The method of claim 1 further comprising performing the frequency direction differential correlations using a sliding widow method by:

filling a circular buffer of the user equipment is up to a correlation length with conjugate complex multiplications;

outputting a summation of the conjugate complex multiplications as an initial correlation value;

for each new frequency value sample offset of the first section and the second section, fetching an oldest entry of the circular buffer;

subtracting the oldest entry from the previously output correlation value;

after the oldest entry is subtracted, calculating a new conjugate complex multiplication and saving to the circular buffer as the newest entry; and adding the new conjugate complex multiplication to the previously output correlation value.

9. The method of claim 1 further comprising:

verifying and decoding a secondary synchronization signal, data modulation reference signal (PECH DM-RS) and Master Information Block (MIB) of the RF broadcast signal with a PSS identified from searching the localized regions.

10. The method of claim 1 wherein the RF broadcast signal is a 5G new radio broadcast signal.

11. A system for acquiring a primary synchronization signal with user equipment, the system comprising:

a radio frequency (RF) transceiver of the user equipment configured to receive an RF broadcast signal; and a programmable processor of the user equipment configured to receive the RF broadcast signal from the RF transceiver, and wherein the programmable processor is configured to:

execute a time direction differential correlation between a first section of the RF broadcast signal and a second section of the RF broadcast signal;

sum together sections of an output of the time direction differential correlation that are separated by a preconfigured distance; identify a preconfigured number of peak values in results of the summation;

convert the first section and the second section of the RF broadcast signal into frequency domain versions of the first section and the second section that are localized to locations of the preconfigured number of peak values;

execute frequency direction differential correlations between the frequency domain versions of the first section and the second section;

identify maximum values of a ratio between outputs of the frequency direction differential correlations;

identify ones of the maximum values of the ratio that are greater than or equal to a preconfigured threshold value; and search for a primary synchronization signal (PSS) in localized regions of the RF broadcast signal, wherein the localized regions are defined in the time domain by the preconfigured number of peak values in the results of the summing and in the frequency domain by the ones of the maximum values of the ratio that are greater than or equal to a preconfigured threshold value.

12. The system of claim 11 wherein the preconfigured number of peak values is eight.

13. The system of claim 11 wherein the preconfigured distance is equal to a length of two orthogonal frequency-division multiplexing symbols.

14. The system of claim 11 wherein the RF transceiver is further configured to receive the RF broadcast signal by sampling the RF broadcast signal at a length equivalent to at least two synchronization signal block (SSB) periods; and wherein the programmable processor is further configured to separate the RF broadcast signal into the first section and the second section such that the first section and the second section have respective lengths equivalent to at least one SSB period.

15. The system of claim 11 wherein time domain boundaries of the localized regions defined by the preconfigured number of peak values in the results of the summation are plus and minus a cyclic prefix (CP) length of time around a respective sample time value of each of the preconfigured number of peak values, and wherein frequency domain boundaries of the localized regions defined by the ones of the maximum values of the ratio that are greater than or equal to the preconfigured threshold value are plus and minus five frequency bins around a respective frequency offset value of each of the maximum values of the ratio greater than or equal to the preconfigured threshold value.

16. The system of claim 11 wherein the frequency direction differential correlations include a PSS correlation and a zero energy block correlation, and wherein the programmable processor is further configured to calculate the ratio by dividing the PSS block correlation by the zero energy block correlation for each frequency bin in the outputs of the frequency direction differential correlations.

17. The system of claim 11 wherein the programmable processor executing the time direction differential correlation includes using a sliding widow method wherein the programmable processor is configured to:

fill a circular buffer of the user equipment is up to a correlation length with conjugate complex multiplications;

output a summation of the conjugate complex multiplications as an initial correlation value;

sample off set of the first section and the second section, fetch an oldest entry of the circular buffer;

subtract the oldest entry from the previously output correlation value;

after the oldest entry is subtracted, calculate a new conjugate complex multiplication and save to the circular buffer as the newest entry; and add the new conjugate complex multiplication to the previously output correlation value.

18. The system of claim 11 wherein the programmable processor executing the frequency direction differential correlations includes using a sliding widow method wherein the programmable processor is configured to:

fill a circular buffer of the user equipment is up to a correlation length with conjugate complex multiplications;

output a summation of the conjugate complex multiplications as an initial correlation value;

for each new frequency value sample offset of the first section and the second section, fetch an oldest entry of the circular buffer;

subtract the oldest entry from the previously output correlation value;

after the oldest entry is subtracted, calculate a new conjugate complex multiplication and save to the circular buffer as the newest entry; and add the new conjugate complex multiplication to the previously output correlation value.

19. The system of claim 11 wherein the programmable processor is further configured to verify and decode a secondary synchronization signal, data modulation reference signal (PECH DM-RS) and Master Information Block (MIB) of the RF broadcast signal with a PSS identified from searching the localized regions.

20. The system of claim 11 wherein the RF broadcast signal is a 5G new radio broadcast signal.

* * * * *